United States Patent
Schrauf et al.

(10) Patent No.: US 9,623,959 B2
(45) Date of Patent: Apr. 18, 2017

(54) AIRCRAFT HAVING AN AIRCRAFT FUSELAGE AND AN AIR SUCKING FUSELAGE COMPONENT

(71) Applicant: AIRBUS OPERATIONS GMBH, Hamburg (DE)

(72) Inventors: Géza Schrauf, Bremen (DE); Hubert Stuke, Delmenhorst (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/850,353

(22) Filed: Mar. 26, 2013

(65) Prior Publication Data

US 2013/0270390 A1    Oct. 17, 2013

Related U.S. Application Data

(60) Provisional application No. 61/616,292, filed on Mar. 27, 2012.

(30) Foreign Application Priority Data

Mar. 27, 2012    (DE) .................... 10 2012 006 194

(51) Int. Cl.
  *B64C 21/06*    (2006.01)
  *B64C 5/06*    (2006.01)
(52) U.S. Cl.
  CPC ................ *B64C 21/06* (2013.01); *B64C 5/06* (2013.01); *Y02T 50/166* (2013.01)
(58) Field of Classification Search
  CPC ........ Y02T 50/168; B64C 21/06; B64C 21/08
  USPC ........................................................ 244/209
  See application file for complete search history.

(56) References Cited

U.S. PATENT DOCUMENTS

| 2,428,585 | A  | * | 10/1947 | Rogers ...................... 244/129.1 |
| 7,200,999 | B2 |   | 4/2007  | Bagnall et al. |
| 7,866,609 | B2 |   | 1/2011  | Parikh |
| 8,128,037 | B2 |   | 3/2012  | Powell et al. |
| 8,245,976 | B2 |   | 8/2012  | Sakurai et al. |
| 2009/0020653 | A1 |   | 1/2009  | Schrauf |
| 2010/0181435 | A1 | * | 7/2010  | Sakurai et al. ............... 244/209 |

FOREIGN PATENT DOCUMENTS

DE    10361390 A1    8/2005

OTHER PUBLICATIONS

German Patent Office, German Search Report dated Oct. 11, 2014 for German Patent Application No. 102012006194.3.
German Patent Office, German Search Report dated Nov. 27, 2012 for German Patent Application No. 102012006194.3.

* cited by examiner

*Primary Examiner* — Brian M O'Hara
(74) *Attorney, Agent, or Firm* — Lorenz & Kopf, LLC

(57) ABSTRACT

An aircraft having an aircraft fuselage that has an outer skin includes an air sucking fuselage component with an outer surface that is perforated at least in some regions, and a suction profile body. The suction profile body is arranged on the outer skin, forms a local bulge in the outer skin, and further includes a suction opening that is arranged at a location at which there is the lowest pressure, for example at a position furthest away from the outer skin. The suction opening is connected to a suction connection of the air sucking fuselage component. In this way laminarization of the flow at the air sucking fuselage component may take place without the use of active air conveying devices.

20 Claims, 3 Drawing Sheets

AIRCRAFT HAVING AN AIRCRAFT FUSELAGE AND AN AIR SUCKING FUSELAGE COMPONENT

CROSS-REFERENCE TO RELATED APPLICATIONS

This application claims priority to German Patent Application No. 10 2012 006 194.3, filed Mar. 27, 2012 and to U.S. Provisional Patent Application No. 61/616,292, filed Mar. 27, 2012, which are incorporated herein by reference in their entirety.

TECHNICAL FIELD

The technical field relates to an aircraft having an aircraft fuselage that has an outer skin, comprising an air sucking fuselage component with an outer surface that is perforated at least in some regions.

BACKGROUND

Vehicles that attain high speeds relative to air are generally designed so as to be aerodynamically favorable in order to reduce drag and thus increase their efficiency. From certain speed ranges onwards it can be observed that, due to airflow deflections at higher speeds, turbulent boundary layers arise on surfaces of vehicle body components that project directly into the airstream, for example on leading edges of tail units or wing assemblies of aircraft. Designing these aerodynamic components to reduce the drag caused by boundary layers is, however, not entirely viable due to the associated limitations of design space or functions. Therefore, in order to reduce drag resulting from the turbulent boundary layer, concepts exist for sucking air from upstream regions of tail units and wing assemblies of aircraft for reducing drag, which concepts are, however, at present only used in research aircraft or research vehicles. The vehicle body component under investigation is, for example, implemented in the form of a tail leading edge or a wing leading edge comprising suction openings, which vehicle body component extends from an upstream forward delimitation, for example a leading edge, to a forward spar of the structure of the tail unit or wing assembly.

In research aircraft in which such suction removal of air from a turbulent boundary layer takes place by way of a vehicle body component with openings, the vehicle body component under investigation is usually designed as a double-walled structure comprising an outer sheet and an inner sheet. These sheets are spaced apart from each other at a constant distance and are interconnected by means of strip- or ribbon-shaped webs. This results in several suction chambers from which, by actively applying negative pressure or suction, air may be sucked in by way of the suction openings of the outer sheet.

EP 1 699 686 A1 and US 2009 0020653 A1 show a device for the removal by suction of a boundary layer from the surface of an aircraft in which the air removed by suction is fed to an air conditioning system.

In addition, other objects, desirable features and characteristics will become apparent from the subsequent summary and detailed description, and the appended claims, taken in conjunction with the accompanying drawings and this background.

SUMMARY

Active removal by suction of the boundary layer requires a constant supply of energy, thus reducing the overall efficiency of the vehicle. Accordingly, the present disclosure provides a vehicle comprising at least one air sucking vehicle body component, and requires as little energy as possible for the removal by suction of the boundary layer.

An aircraft having a fuselage that comprises an outer skin is proposed. In an exemplary embodiment the aircraft comprises an air sucking fuselage component with an outer surface that is perforated at least in some regions and a suction profile body. The suction profile body is arranged on the outer skin, forms a local bulge on the outer skin, and further comprises a suction opening that is arranged at a location at which there is the lowest pressure in an airflow during flight. The suction opening is connected to a suction connection of the air sucking fuselage component.

As a matter of principle, an aircraft comprises a fuselage that aerodynamically is particularly efficient, which fuselage is delimited by an outer skin. With the exception of a few regions the shape of the outer skin is smooth and continuous so that the fuselage generates as little drag as possible. At locations where, for example, a tail unit is arranged which with one or several leading edges projects directly into the airstream, turbulent boundary layers may form in the flow, which has a negative effect on aerodynamic efficiency. Removing air by suction at these positions may result in a particularly advantageous airflow and in reduced drag.

It is desirable to achieve, to the greatest extent possible, passive suction removal of air from such a turbulent boundary layer in that on the outer skin a pressure sink is generated that causes a suction effect. The pressure sink is achieved by the suction profile body stated, which is arranged on the outer skin. As a result of a shape that represents a local bulge on the otherwise smooth outer skin, because of the airflow, for example at a position near the largest distance to the outer skin, a maximum suction effect results from a locally low, or lowest-possible, pressure. By integration of a suction opening at this position the suction effect may be used for an air sucking fuselage component that follows on from the suction opening or that is connected by way of a line. With a corresponding design of the suction profile body, at the suction opening such an extent of suction may be generated that is sufficient to remove air by suction from the boundary layer on an aircraft fuselage component. Thus for the design case, for example cruising, it is not necessary to use an air conveying device that constantly needs to be supplied with power. Accordingly, the suction opening should be arranged at a location of the suction profile body at which location according to the design case the lowest pressure is present. As a rule, this may be near a point where the distance to the outer skin is greatest.

In an exemplary embodiment the suction profile body is arranged on a vertical stabilizer. The arrangement may, for example, be at an upper delimitation edge of the vertical stabilizer, which in particular favors the removal by suction of air from a boundary layer that forms at the leading edge of the vertical stabilizer. In this case the necessary line length can be quite short, wherein it is imaginable that the air sucking fuselage component on the leading edge of the vertical stabilizer extends to the suction profile body and is then directly connected to said suction profile body.

In an exemplary embodiment the suction profile body is arranged on the underside of the aircraft fuselage. At that location there is usually a smooth surface at which the suction effect of the suction profile body may be quite distinct. A suitable position for accommodating the suction profile body may thus be selected relatively freely and may be adapted to flow characteristics on the underside.

If the aircraft under consideration is a commercial aircraft that comprises a wing-to-fuselage transition fairing (in other words a "belly fairing"), it is imaginable for this fairing to be designed in such a manner that in that location at least in some regions a suction effect may be generated. For this purpose it may make sense to provide, for example, lateral curved surfaces, which are arranged upstream, which surfaces can comprise a suction opening. This obviates the need to install a separate suction profile body on the aircraft.

In an exemplary embodiment the suction profile body is arranged upstream of an outlet valve of an air conditioning system. At the outlet valve a continuous air volume flow is available, which volume flow conveys exhaust air from the air conditioning system from the aircraft into the surroundings of said aircraft. If a suction profile body situated directly downstream of the aforesaid were to be subjected to airflow, the suction effect on the suction profile body would be disturbed.

In another embodiment the suction profile body is arranged laterally of an outlet valve of an air conditioning system. Consequently the exhaust air flow from the outlet valve may be influenced as little as possible by the suction profile body.

In an exemplary embodiment the aircraft furthermore comprises an air conveying device arranged between the suction opening of the suction profile body and the suction connection of the air sucking fuselage component. This is necessary in particular if the speed is not yet sufficient for complete passive removal by suction. This could, for example, be the case shortly after takeoff in a climbing phase.

In an exemplary embodiment the aircraft comprises a closing device for selectively closing the suction opening of the air sucking fuselage component. Closing may, in particular, prevent dirt, or humidity from entering the suction opening, which would permanently interfere with suction.

In an exemplary embodiment of the present disclosure, the closing device is a flap that may be moved to a closed position and to at least one open position. The flap may, for example, be slidably or pivotally arranged on the suction opening so that the free cross-section may be varied when required. If, for example, the suction opening in the suction profile body is quite large, possibly at somewhat lower speeds a greater suction effect may be generated, wherein at higher speeds the cross section of the suction opening may be reduced.

In one embodiment of the present disclosure, the flap may be moved to an outward directed position as a deflector in front of the suction opening. In particular during takeoff and landing phases, dirt may enter the suction opening, which may be prevented by a deflector function of the flap. In this arrangement the flap is moved to a position that is located upstream of the suction opening. Consequently, dirt may impinge the flap, but not the suction opening situated behind it, which suction opening nevertheless allows active suction by means of an air conveying device. At cruising altitude the deflector function is no longer necessary, and consequently purely passive suction may take place at that altitude.

In an exemplary embodiment the suction opening of the suction profile body in a direction of extension has a dimension ranging from about 50 to about 1000 mm. In one example, this dimension ranges from about 50 to about 500 mm. In this context the term "extension" refers, for example, to a diameter, a width or a length of the suction opening, depending on the design of said suction opening.

In an exemplary embodiment the suction profile body comprises a droplet shape with a rounded end of the droplet and a pointed end of the droplet, wherein the rounded end of the droplet points in the direction of flight of the aircraft. As a result of this design, the smallest possible additional drag is generated, albeit accompanied by a relatively distinct suction effect.

In an exemplary embodiment the outer surface of the air sucking aircraft component is microperforated, at least in some regions, and comprises holes of a diameter ranging from about 25 to about 100 μm. Adequate suction is achieved with such microperforation; at the same time, however, the holes do not create any appreciable additional drag.

In an exemplary embodiment the holes are arranged so as to be equidistant from each other, with the distance ranging from about 0.1 mm to about 10 mm. In this way a particularly large suction cross section may be generated.

A suction connection in the interior of the air sucking fuselage component may be implemented in that on the inside at a distance from the perforated surface an intermediate wall is arranged so that a suction chamber results that is in fluidic connection with all the holes of the perforated surface. The suction chamber may be supplemented by further intermediate walls or end walls so that on a single delimitation wall a central suction connection in the form of a hole with a flange or similar devices may be arranged, at which suction connection air from the boundary layer may be sucked in as a result of the action of suction.

It may be helpful to furthermore make the suction connection blockable by way of a valve.

The present disclosure further relates to the use of a suction profile body at an outer skin of an aircraft fuselage for generating suction for the removal by suction of air from an air sucking component.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
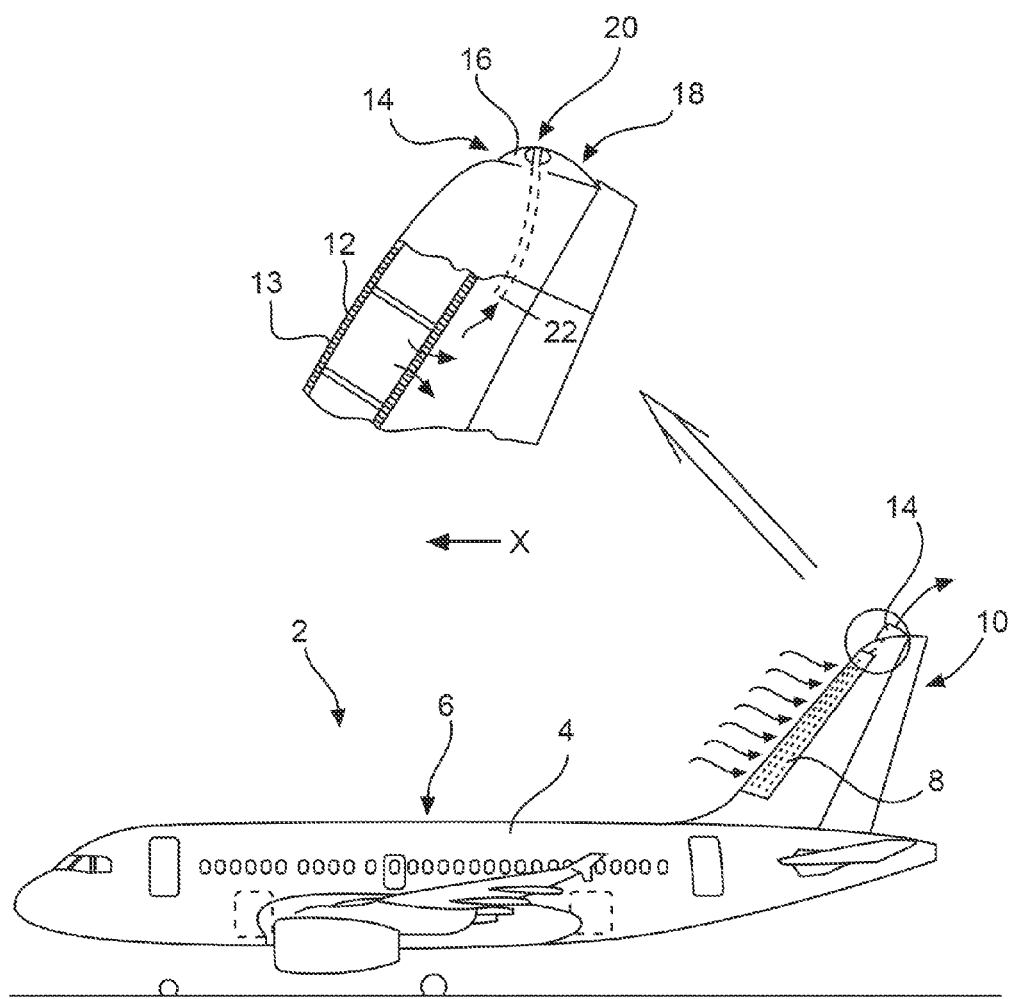
FIG. 1 shows a lateral view of an exemplary embodiment of an aircraft.

FIG. 1 shows an aircraft 2 with an aircraft fuselage 4, comprising an outer skin 6 and an air sucking fuselage component 8 on a vertical stabilizer 10. Said aircraft fuselage component 8 comprises a perforated surface 12, directed in the direction of flight x, with a number of holes 13 through which air is removed by suction from a turbulent boundary layer of the vertical stabilizer 10. The aircraft fuselage component 8 forms part of the leading edge of the vertical stabilizer and is directly subjected to the airflow that occurs around the aircraft 2. As a result of removal by suction, turbulence in the boundary layer is prevented from arising so that said boundary layer remains laminar, thus resulting in considerably reduced friction loss.

In order to produce an adequate suction effect a suction profile body 14 is arranged at the top of the vertical stabilizer 10; with said suction profile body 14 being designed in the form of a droplet with a rounded end 16 of the droplet and a pointed end 18 of the droplet. The rounded end 16 of the droplet points in the direction of flight x. In flight, airflow impinges on the suction profile body 16 and generates the greatest negative pressure at its position spaced furthest from the outer skin or the underlying structure of the aircraft 2. At this position there is a suction opening 20 that is connected to a suction connection 22 of the air sucking fuselage component 8. At an adequate flight speed suction at the suction opening 20 is sufficiently strong on its own to create laminarization of the flow at the air sucking fuselage component 8. In principle the form of the suction profile body 14 is to be designed so that completely passive removal by suction becomes possible in cruise flight.

Figure 2:
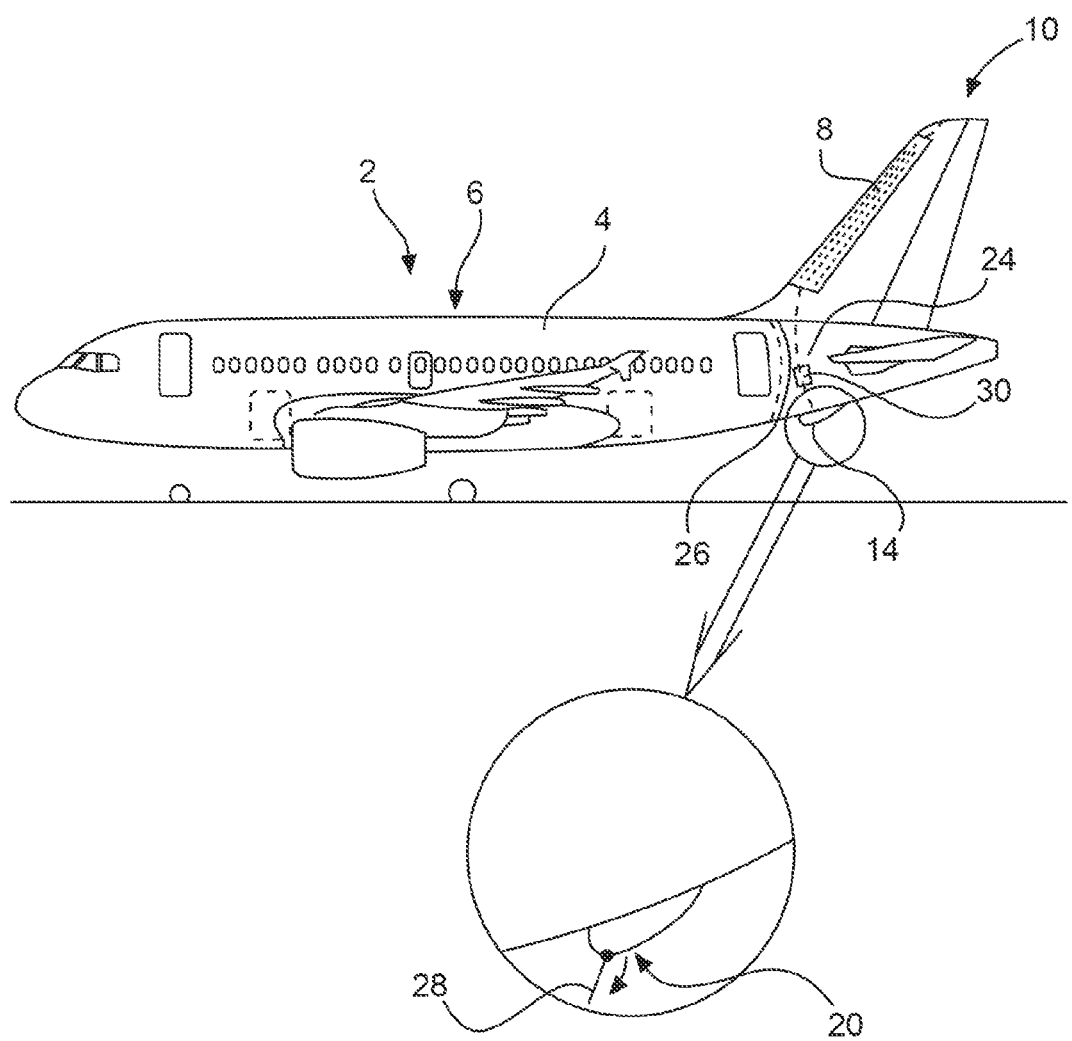
FIG. 2 shows a lateral view of an exemplary embodiment of an aircraft.

FIG. 2 shows another embodiment of this concept, in which modification the suction profile body 14 is arranged on the underside of the aircraft fuselage 4 and is connected to the suction connection 22 by way of a line 24. In one example, the suction profile body 14 is arranged in the longitudinal direction of the aircraft 2 downstream of a pressure bulkhead 26 of a cabin formed in the aircraft 2, and consequently the line 24 may particularly easily be routed through a non-pressurized region of the aircraft 2.

If in this region an outlet valve of an air conditioning system is arranged, it is recommended that the suction profile body 14 be arranged laterally of the outlet valve so as to be offset, or upstream, in order to avoid mutual flow interference.

The diagram furthermore shows a closing device 28 in the form of a flap that is pivotable upstream in front of the suction opening 20 in order to be able to provide a deflector function. This prevents whirled-up dust or the like entering the suction opening 20 when the latter is open. In order to achieve removal by suction of the turbulent boundary layer during flight phases in which the flight speed is inadequate, in addition an air conveying device 30 may be used which makes it possible to actively, for example by taking up electrical power, convey air from the air sucking fuselage component 8.

Figure 3:
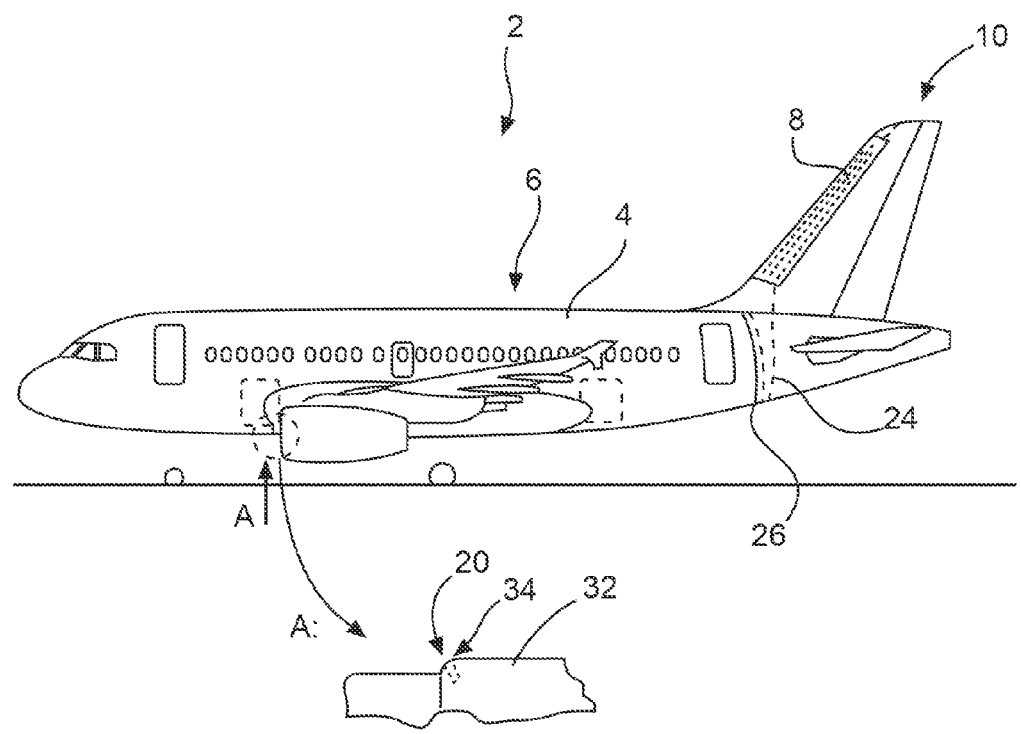
FIG. 3 shows a lateral view of an exemplary embodiment of an aircraft.

FIG. 3 shows a further embodiment in which the suction profile body is laterally integrated in a forward protrusion 34, which points upstream, of a fairing body of a belly fairing 32. In this arrangement there is no need to design a separate suction profile body; instead, all the tasks may be carried out with merely an additional suction line 24, which saves components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft having an aircraft fuselage that has an outer skin, comprising:
   an air sucking fuselage component with an outer surface that is perforated at least in some regions; and
   a suction profile body arranged on the outer skin on top of a vertical stabilizer or on a bottom of the fuselage, that forms a local three-dimensional rounded bulge on the outer skin bulging outwardly from the outer skin, and including a suction opening that is arranged at a location of the suction profile body at which there is the lowest pressure in an airflow during the flight,
   wherein the air sucking fuselage component and the suction profile body are in fluid communication, the suction opening being connected to a suction connection of the air sucking fuselage component.

2. The aircraft of claim 1, wherein the location of the suction profile body at which the lowest pressure is present during the flight is the location on the suction profile body farthest from the outer skin of the aircraft fuselage.

3. The aircraft of claim 1, wherein the suction profile body is arranged on the top of the vertical stabilizer.

4. The aircraft of claim 3, wherein the suction profile body is arranged on an upper delimitation surface of the vertical stabilizer.

5. The aircraft of claim 1, wherein the suction profile body is arranged on an underside of the aircraft fuselage.

6. The aircraft of claim 5, wherein the suction profile body follows on upstream of an outlet valve of an air conditioning system.

7. The aircraft of claim 1, further comprising an air conveying device that is arranged between the suction opening of the suction profile body and the suction connection of the air sucking fuselage component.

8. The aircraft of claim 1, further comprising a closing device for selectively closing the suction opening of the suction profile body.

9. The aircraft of claim 8, wherein the closing device is a flap that is movable to a closed position and to at least one open position.

10. The aircraft of claim 8, wherein the flap is movable to an outward directed position as a deflector in front of the suction opening.

11. The aircraft of claim 1, wherein the suction opening of the suction profile body has a diameter ranging from 50 mm to 1000 mm.

12. The aircraft of claim 1, wherein the suction profile body has a droplet shape with a rounded end of the droplet and a pointed end of the droplet, wherein the rounded end of the droplet points in the direction of flight of the aircraft.

13. The aircraft of claim 1, wherein the outer surface is microperforated, at least in some regions, and comprises holes of a diameter ranging from 25 to 100 µm.

14. The aircraft of claim 13, wherein the holes are arranged so as to be equidistant from each other, with the distance ranging from 0.1 mm to 10 mm.

15. An aircraft having an aircraft fuselage that has an outer skin, comprising:
   an air sucking fuselage component with an outer surface that is perforated at least in some regions;
   a suction profile body arranged on the outer skin on to of a vertical stabilizer or on a bottom of the fuselage, that forms a local rounded three-dimensional bulge on the outer skin bulging outwardly from the outer skin, and including a suction opening that is arranged at a location of the suction profile body at which there is the lowest pressure in an airflow during the flight; and a closing device for selectively closing the suction opening of the suction profile body, wherein the air sucking fuselage component and the suction profile body are in fluid communication, the suction opening being connected to a suction connection of the air sucking fuselage component.

16. The aircraft of claim 15, wherein the closing device is a flap that is movable to a closed position and to at least one open position.

17. The aircraft of claim 15, wherein the flap is movable to an outward directed position as a deflector in front of the suction opening.

18. The aircraft of claim 15, wherein the suction profile body has a droplet shape with a rounded end of the droplet and a pointed end of the droplet, wherein the rounded end of the droplet points in the direction of flight of the aircraft.

19. The aircraft of claim 15, wherein the location of the suction profile body at which the lowest pressure is present during the flight is the location on the suction profile body farthest from the outer skin of the aircraft fuselage.

20. The aircraft of claim 15, wherein the suction profile body is arranged on the to of the vertical stabilizer.

* * * * *